United States Patent [19]

Peilloud

[11] Patent Number: 4,988,219
[45] Date of Patent: Jan. 29, 1991

[54] ROLLER BEARING ASSEMBLY WITH SENSOR DEVICE

[75] Inventor: Fernand Peilloud, Hery sur Alby, France

[73] Assignee: The Torrington Company, Torrington, Conn.

[21] Appl. No.: 527,681

[22] Filed: May 22, 1990

Related U.S. Application Data

[63] Continuation of Ser. No. 292,857, Jan. 3, 1989, abandoned.

[30] Foreign Application Priority Data

Jan. 28, 1988 [FR] France .................. 88 01034

[51] Int. Cl.$^5$ .......................... F16C 33/30; G01D 3/48
[52] U.S. Cl. .......................... 384/448; 324/174
[58] Field of Search ............... 384/446, 448; 324/160, 324/166, 174; 310/155, 168

[56] References Cited

U.S. PATENT DOCUMENTS

| | | | |
|---|---|---|---|
| 3,616,687 | 11/1971 | Wignall | 324/174 |
| 4,688,951 | 8/1987 | Guers | 384/446 |
| 4,732,494 | 3/1988 | Guers et al. | 384/446 X |

FOREIGN PATENT DOCUMENTS 157514 8/1985 Japan .................. 384/448

Primary Examiner—Thomas R. Hannon
Attorney, Agent, or Firm—Frank S. Troidl; Michael H. Minns

[57] ABSTRACT

Rolling bearing assembly with sensor device of the type comprising at least one fixed ring, one rotating ring, rolling elements placed between said rings, a coding element co-rotating with the rotating ring, and a sensing element forming a unit with the fixed ring, characterized in that the coding element is placed in a circular groove on the face of a disk rotating in front of the sensor element mounted on the face of another, stationary disk.

9 Claims, 2 Drawing Sheets

ROLLER BEARING ASSEMBLY WITH SENSOR DEVICE

This application is a continuation of application Ser. No. 292,857, filed Jan. 3, 1989 now abandoned.

The invention pertains to a roller bearing assembly with a sensor device of the type comprising at least one fixed ring, one rotating ring, rolling elements between said rings, a coding element rotating integrally with the rotating ring, and an information sensing and signal processing element held in position with respect to the fixed ring.

More specifically, the invention pertains to an assembly used for the implementation of devices for measuring the revolutions-per-minute (RPM) of a device or the linear speed of a material, as well as to the unit counting of material elements.

Known assemblies are not very reliable because they use complex mechanisms, which are also expensive to build. There thus exists a need for simple, integrated designs which make it possible to exploit the reliability and rotational precision of conventional roller bearings, with which sensor devices of simple design are associated.

According to the invention, the sensor device consists of a coding element placed in a circular groove on the surface of a disk, which rotates in front of a sensing element attached to the face of another, fixed disk. The coding element can be, as a nonlimiting example, a multipole magnetized ring. In this case, the sensor element is a Hall-effect probe or a magnetoresistor, in accordance with the sensing device described in French Patent No. 2,599,794.

It is advantageous for the sensors to be associated with an electronic signal processing circuit, so that assemblies needing only to receive an external connector can be produced.

The sensor and its processing circuit will be, for example, mounted to a disk made of a molded plastic material, such as an epoxy resin, carrying a socket or jacks to accommodate a connector.

In combination with a roller bearing, the resulting bearing can be used advantageously to obtain tachymetric devices for rotating axles and shafts, linear speed measuring instruments, or unit-counting devices.

According to one implementation of the invention, the sensor or, more generally, the signal processing circuit, is mounted on a disk carrying a printed circuit and connections ending in a connector socket coaxial with the roller bearing.

Other characteristics and advantages of the bearing can be derived from a description of the embodiments thereof, with reference to the attached drawings in which:

FIG. 1 shows the actual installation of a bearing with a device for sensing the speed of a rotating roll, for measuring the linear speed of a material in contact with said roll, or for the counting of unit elements on condition that the outside circumference of the roll is designed to be rotated by said elements.

Figure 1:
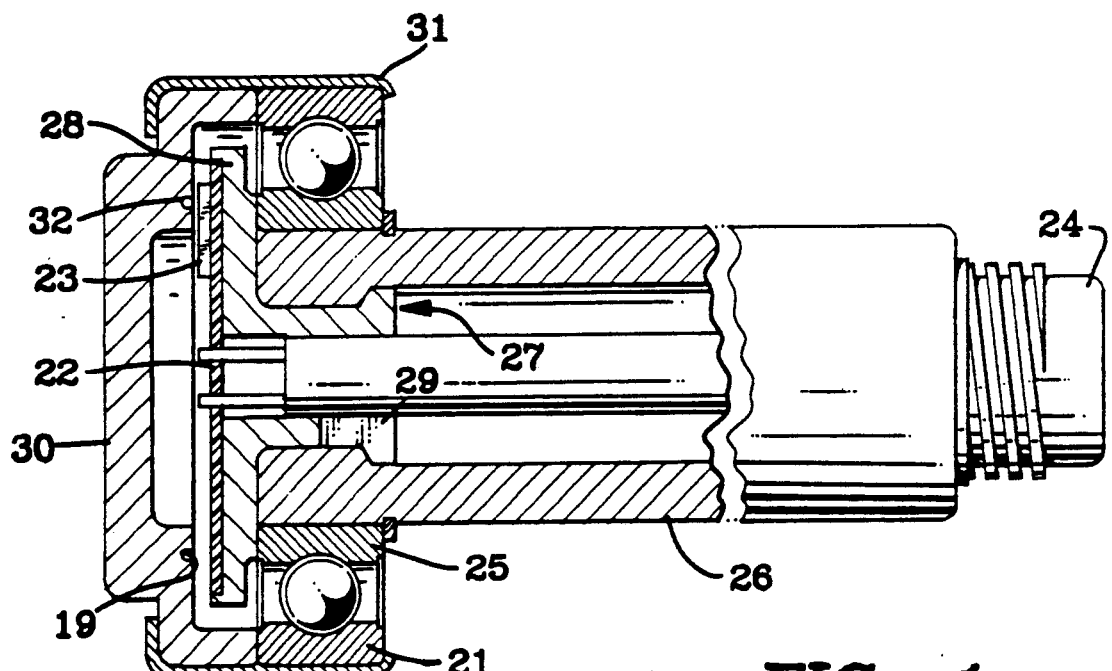
FIG. 1 is a longitudinal cross-section of a bearing assembly for measuring RPM or linear speed and for unit counting.

In FIG. 1, a fixed inner ring 25 of the roller bearing is mounted on a hollow shaft 26, which acts as a support for the bearing assembly. Inner ring 25 is immobilized axially between a retaining ring and against the outer face of a support disk 28 which extends axially into a hub 27 coaxial to the roller bearing in the plane of the latter. This hub consists of a series of flexible tongues 29, which, in combination, carry and axially retain support disk 28 with respect to shaft 26.

The outer face of support disk 28 carries a sensor element 23, in turn associated with a disk 22 recessed into the outer face of support disk 28. Disk 22 can advantageously carry a signal processing circuit or a microprocessor associated with sensor 23, according to known techniques for building circuits with electronic components; the central portion carries the leads to an external connector 24, mounted on the shaft 26, coaxial to said connector, and with a diameter greater than the diameter of said connector.

The rotating portion of the assembly consists of rotating outer ring 21, on which is supported a rotating disk 30, forming a cover pressing on ring 21. Disk 30 and ring 21 are connected by a cylindrical bushing 31, the lateral edges of which are crimped onto ring 21 and disk 30, respectively. The cylindrical bushing acts, if necessary, as a support for arrangements not shown in FIG. 1 designed to interact with the element or material whose rotation or linear speed one wishes to measure, or with elements which are to be counted as units. This arrangement may consist, for example, of a band of elastomeric material for applications concerning measurements of speed and passage of material. In this case, it will be necessary merely to ensure contact between said band and the shaft whose RPM are to be measured or the material whose linear speed is to be measured. For the unit counting of elements, one need merely design a band whose external profile is a repetition of unit profiles, such that, as each element passes, it causes the bearing to rotate by a fraction of a revolution corresponding to the spacing of said unit profiles.

The inner face of disk 30 carries a circular groove 19, into which is molded a coding element 32, which is thus caused to rotate integrally with the assembly consisting of outer ring 21 of the roller bearing, disk 30, and cylindrical bushing 31.

Figure 2:
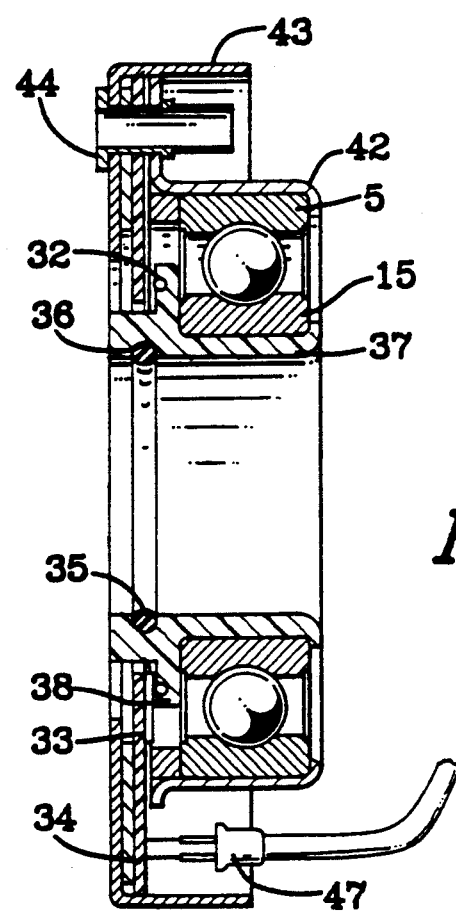
FIG. 2 is a longitudinal cross-section of a tachymeter, in which a bearing according to the invention is used.

In FIG. 2, a tachymeter for a rotating shaft is shown, the roller bearing for which, represented by its rings 5 and 15, is mounted on a hub 37 with a cylindrical bearing surface coaxial to the roller bearing and in the plane thereof. Hub 37, which can be made of plastic, comprises peripheral disk 38, which carries on its outer face coding element 32, housed in a groove.

Coding element 32 rotates in front of sensor 33 associated with a second disk 34; the latter may advantageously carry a signal processing circuit or a microprocessor associated with sensor 33, as described with reference to FIG. 1. Disk 34 also carries the leads of a connector 47, which extend, for example, into the space created between two cylindrical bushings 42 and 43.

Disk 34 is formed into a single unit with fixed outer ring 5 of the roller bearing by means of two cylindrical bushings 42 and 43, assembled by riveting with hollow rivets 44, the axial orifice of which makes it possible to halt the rotation of a fixed portion of the tachymeter by any known means.

Hub 37, which carries coding element 32, defines an installation space carrying the axial retaining system for the hub on the shaft whose speed is to be measured. According to FIG. 2, the hub is axially retained on a shaft (not shown) by means of an elastic ring 35, engaged in a circular groove 36 inside the hub.

Figure 3:
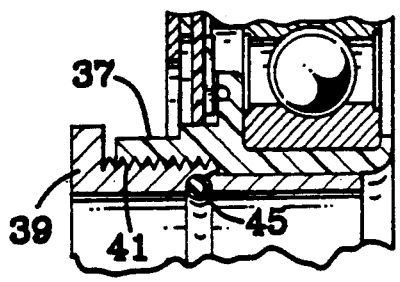
FIG. 3 is a partial longitudinal cross-section of a variant of the tachymeter according to FIG. 2, accommodating a bushing for installation on a rotating shaft.
Figure 4:
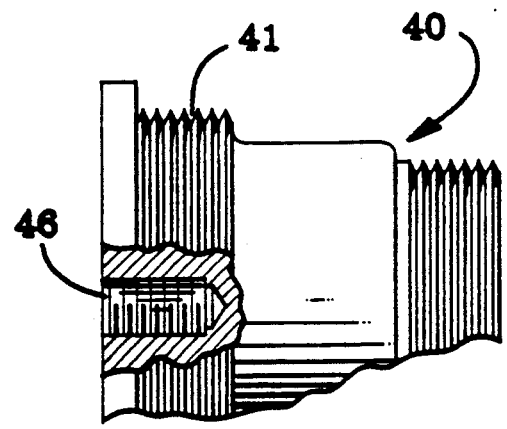
FIG. 4 is an elevation of a hub that can be adapted to the tachymeter, according to FIG. 2, according to the variant shown in FIG. 3.

According to another embodiment, as shown in FIG. 3, hub 37 is axially retained by means of a bushing 39, the inside diameter of which is adapted to the diameter of the shaft whose speed is to be measured. This bushing, which carries an elastic ring as described above, is made into a single unit with hub 37 by means of threads 41 tapped into a hole in hub 37, the latter being axially defined by a shoulder 45 acting as an axial stop for bushing 39. According to another embodiment as shown in FIG. 4, bushing 39 can be replaced by a shaft 40 provided with threads 41 screwed into hub 37 as described above. Shaft 40 can also be equipped with a recess 46 to accommodate a threaded element.

Figure 5:
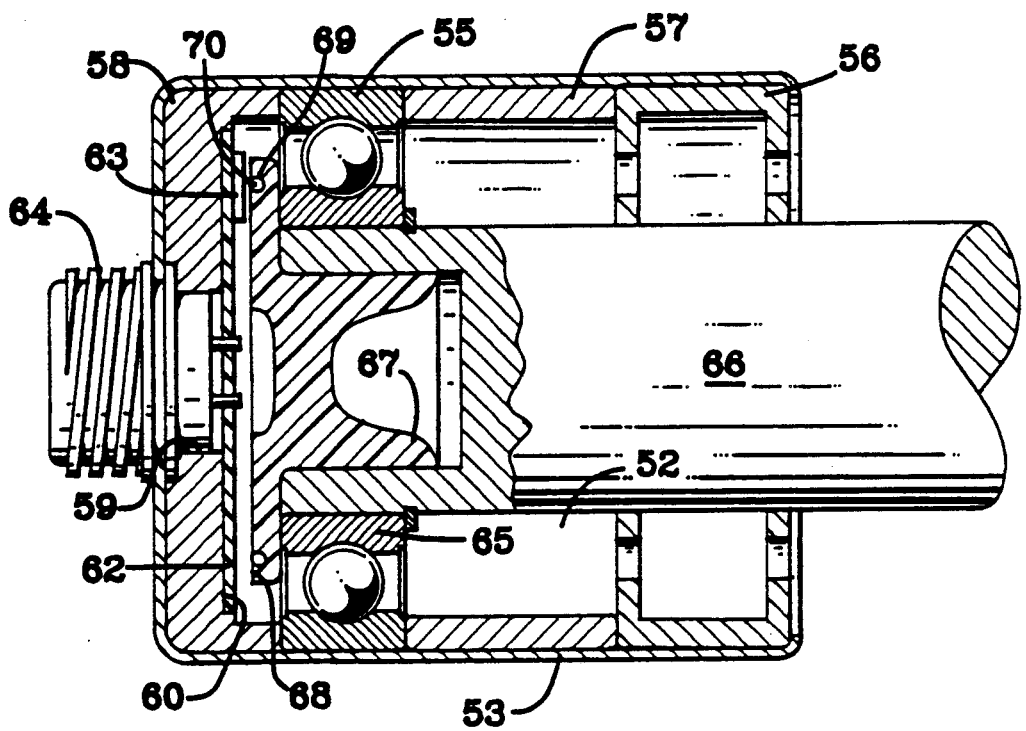
FIG. 5 is a longitudinal cross-section of a rotating shaft bearing according to the invention.

FIG. 5 shows an actual installation of a bearing with a device for sensing the speed of a rotating shaft or for measuring the speed of a transmission element such as a pulley or a gear wheel, mounted fixedly on said shaft.

The bearing, according to FIG. 5, comprises fixed outer rings immobilized in a chamber 52, defined by a cylindrical cap 53, in which are housed fixed rings 55 and 56 of a ball bearing and a roller bearing. Rings 55 and 56 are held in position by a bushing 57. A fixed disk 58, which extends axially to form a collar in contact with ring 55, is provided with an axial hole 59 and has an inner face 60, which provides the housing for the sensor, mounted on a flat disk 62. Disk 62 carries the printed circuit for sensor 63, which can advantageously be associated with a signal processing circuit or with a microprocessor, as described earlier. The central part of disk 62 carries the leads to a socket 64 for an external connector, which extends axially through disk 58 and cap 53.

The rotating part of the bearing consists of ring 65 of the roller bearing, which rotates integrally with a shaft 66 on which it is mounted with a shrink fit and axially immobilized. Shaft 66 has a blind hole, into which is pressed hub 67 of disk 68, one face of which extends to contact ring 65 of the roller bearing. The other face of disk 68 has a circular groove 69, in which is housed a coding element 70, mounted so that it moves conjointly with the shaft in front of sensor element 63.

To reduce the inertia of disk 68, which carries coder 70, hub 67 thereof has a cylindrical bearing surface which is coaxial to the roller bearing with rings 55 and 65 and in the plane thereof.

Cylindrical shaft 66 may serve as support for an arrangement not shown in FIG. 5. This arrangement can consist, for example, of a transmission element such as a pulley or gear wheel, mounted on said shaft.

In this case, it will be necessary simply to establish, by any known means, an immobilizing contact between shaft 66 and said transmission element.

Without going beyond the context of the invention, it is obvious that the sensor device can be of any known type. Similarly, the invention is in no way limited to the embodiment described and represented, which is given merely as an example.

In particular, the invention embraces technical means equivalent to the means described or combinations thereof insofar as the latter are implemented in the spirit of the invention or carried out in the context of a measurement of rotational speed.

I claim:

1. A bearing assembly with a sensor device, said assembly comprising:
   a first ring having a bore defining an inner diameter;
   a second ring having a bore and also having an outside diameter smaller than the inner diameter of the first ring, said second ring being radially aligned with the first ring;
   one of said rings being fixed and the other of said rings being rotatable;
   multiple rolling elements between said fixed and rotating rings;
   a stationary sensing disk connected to the fixed ring and having a sensing element mounted on a face of said sensing disk;
   a rotatable coding disk connected to the rotatable ring and having a coding element located on a face of said coding disk and in proximity to said sensing disk so that said coding element rotates in proximity to said sensing element; and
   one of said sensing and coding disks having a hub extending axially into the second ring bore, the hub having a cylindrical bearing surface coaxial to and radially coplanar with said rings.

2. A bearing assembly according to claim 1, wherein said sensing disk has said hub which extends axially into the second ring bore.

3. A bearing assembly according to claim 2, wherein said assembly further comprises a stationary cylindrical shaft supporting said fixed ring, and an electrical connector is coaxial to said rings and has a diameter less than the diameter of said shaft.

4. A bearing assembly according to claim 1, wherein said coding disk has said hub which extends axially into the second ring bore.

5. A bearing assembly according to claim 4, wherein said hub of said coding disk defines an installation space carrying a means for axially retaining said hub.

6. Assembly according to claim 5, wherein said means for axially retaining said hub comprises a mounting ring engaged in a circular groove in said hub.

7. Assembly according to claim 5, wherein said means for axially retaining said hub comprises a bushing or a shaft utilized in conjunction with a threaded hole tapped into said hub, wherein said bushing or shaft is limited axially by a shoulder acting as a stop for said bushing or shaft.

8. A bearing assembly according to claim 2 or claim 4, wherein said stationary disk also carries a signal processing circuit or a microprocessor and leads to a connector.

9. A bearing assembly according to claim 8 wherein said assembly further comprises a stationary cylindrical cap supporting said fixed ring, and wherein said connector is coaxial to said bearing assembly and has a diameter less than the diameter of said cap.

* * * * *